United States Patent
Kitano et al.

[15] 3,696,897
[45] Oct. 10, 1972

[54] FORWARD-REVERSE AND BRAKE INCHING CONTROL

[72] Inventors: Shin Kitano; Yutaka Momose, both of Kariya, Japan

[73] Assignee: Aisin Seiki Kabushiki Kaisha, Kariya-shi, Aichi-ken, Japan

[22] Filed: June 25, 1971

[21] Appl. No.: 156,684

[30] Foreign Application Priority Data

June 27, 1970 Japan....................45/56234

[52] U.S. Cl...............192/4 C, 192/12 C, 192/13 R, 192/87.19, 192/109 F, 91/391, 91/368, 60/54.5
[51] Int. Cl......................F16h 57/10, F16d 67/04
[58] Field of Search............192/12 C, 13 R, 4 A, 4 C

[56] References Cited

UNITED STATES PATENTS

| | | | |
|---|---|---|---|
| 3,441,114 | 4/1969 | Pensa............................ | 192/4 C |
| 3,613,844 | 10/1971 | Asano et al................. | 192/4 C |

*Primary Examiner*—Benjamin W. Wyche
*Attorney*—Berman, Davison and Berman

[57] ABSTRACT

A transmission control system for a vehicle having a transmission with fluid actuated clutch means and hydraulic brake means for arresting movement of the vehicle comprising, a source of pressurized fluid, a fluid pressure conduit communicating said pressurized fluid to the clutch means, and control valve means disposed within said conduit. The control valve means may comprise a housing provided with a pair of cylindrical bores, a pair of spool valves slidably engaged respectively within said bores to form pressure chambers disposed within said conduit and to control selectively passageways of pressurized fluid through said conduit to engage and disengage the clutch means, a pair of inching pistons slidably engaged within said bores through resilient members interposed between said inching pistons and said spool valves, means for connecting said brake means with said inching pistons, a pair of shift rods slidably engaged within said bores through resilient members interposed between said shift rods and said spool valves, and a shift lever for selectively operating said shift rods.

7 Claims, 1 Drawing Figure

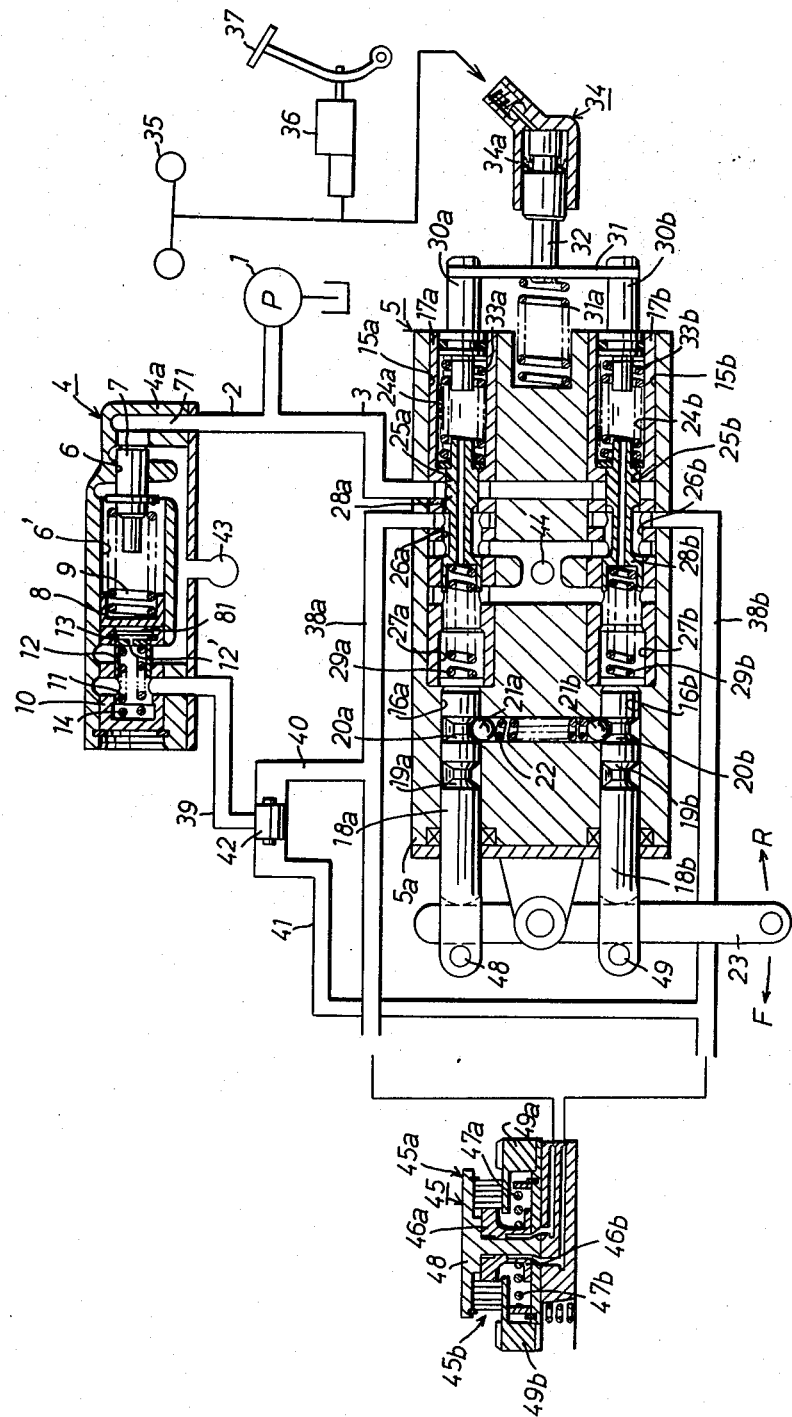

FORWARD-REVERSE AND BRAKE INCHING CONTROL

BACKGROUND

The present invention relates to an automatic transmission control system of a vehicle, and more particularly to a hydraulic control system for such a vehicle as provided with fluid actuated clutch means and a brake system for arresting movement of the vehicle.

Generally it is often required for an industrial vehicle such as a forklift truck provided with a torque converter and the like to have inching movements and shockless and smooth starts. Particularly in the case of a forklift truck, good inching movements have been desired.

To meet the desire, there has been introduced such a vehicle which is provided with inching valve means connected to a brake pedal of the vehicle, shift valve means for selectively transmitting fluid pressure flowing directions to clutch means through the inching valve means, and anti-shock valve means for controlling fluid pressure to the clutch means. With the mentioned vehicle, however, the valve means are installed separately which makes the construction rather large and complicated, which leads to a high cost in manufacturing and further to operation troubles. And the inching valve means is operated directly by the brake pedal of the vehicle, which makes the inching operation very difficult particularly when the prime engine of the vehicle is at its high rotation.

SUMMARY

It is, therefore, an object of the present invention to provide an automatic transmission control system capable of controlling easily the inching movements and of eliminating shocks at starts at any operation of the prime engine.

It is still an object of the present invention to provide an automatic transmission control system having the above-mentioned characteristics, wherein the pertaining control valve means are compactly arranged within a rather small space.

It is another object of the present invention to provide an automatic transmission control system having the above-mentioned characteristics, wherein the difficulties in the inching operation of the vehicle at the high rotational speed of the engine are well eliminated by means of indirect connection between inching valve means and a brake pedal of the vehicle.

It is still another object of the present invention to provide an automatic transmission control system having the above-mentioned characteristics, wherein control valve means may comprise inching valve means functioning also as a fluid pressure flow regulating valve and shift valve means for selecting fluid pressure flowing directions towards the clutch means of the vehicle, wherein the inching valve means is connected indirectly and incorporates with both the shift lever and the brake pedal.

It is yet an object of the present invention to provide an automatic transmission control system having the above-mentioned characteristics, wherein modulator valve means is additionally adopted to increase anti-shock effects at starts of the vehicle.

DESCRIPTION OF THE DRAWING

The novel features that are considered characteristic of the present invention are set forth with particularity in the appended claims. The invention, itself, however, both as to its construction and its method of operation, together with additional objects and advantages thereof, will best be understood from the following description of the specific embodiment when read in connection with the accompanying drawing of a diagramtic hydraulic circuit of the control system in accordance with the present invention.

DESCRIPTION OF THE PREFERRED EMBODIMENT

Referring now more particularly to the drawing, there is illustrated a preferred embodiment of the present invention comprising a fluid pump 1 driven by the prime engine (not shown) of the vehicle. Pressurized operation fluid is delivered to modulator valve means 4 and control valve means 5 respectively through conduits 2 and 3.

The modulator valve means 4 comprises a housing 4a having therein coaxially a cylindrical bore of a small diameter 6 and another cylindrical bore of a large diameter 6'. An axially slidable valve spool 7 is engaged within the small cylindrical bore 6 and an axially slidable valve piston 8 is engaged with the large cylindrical bore 6'. A spring 9 is stretched between the valve spool 7 and the valve piston to resist against thrusting force of fluid pressure acting on the right end face of the valve spool 7 in a first pressure chamber 71 and the left end face of the valve piston 8 in a second pressure chamber 81. The first and second pressure chambers are respectively connected with the conduit 2 and a conduit 39. Pressed into the large cylindrical bore 6' is an orifice valve body 10 which is in contact with the left end face of the valve piston 8. Provided within the orifice valve body 10 is a cavity 11 in which an orifice valve 12 is axially slidably engaged, the orifice valve 12 having an orifice 12' thereon. Rightward movement of the orifice valve 12 is regulated by way of a snap ring 13, a spring 14 being installed against leftward movement of the orifice valve 12.

The control valve means 5 comprises a housing 5a provided therein with large cylindrical bores 15a and 15b positioned parallel to each other. Small cylindrical bores 16a and 16b are also positioned parallel to each other within the housing 5a and are coaxially aligned respectively with the bores 15a and 15b. A forwarding valve group is enclosed within the large bore 15a and the small bore 16a and a reversing valve group is installed within the large bore 15b and the small bore 16b. Sleeve members 17a and 17b are mounted respectively within the large bores 15a and 15b. Engaged axially slidably within the small bores 16a and 16b are shift rods 18a and 18b respectively. Trapezoid grooves 19a and 20a are drilled on the shift rod 18a and also trapezoid grooves 19b and 20b are formed on the shift rod 18b. The shift rods 18a and 18b are positioned by balls 21a and 21b urged by a spring 22 to engage respectively with the trapezoid groove 19a or 20a and the trapezoid groove 19b or 20b. A shift lever 23 is engaged with bifurcated grooves provided on the left ends of the shift rods 18a and 18b so that swinging movement of the shift lever 23 to the forward or reverse direction makes one shift rod go forward or to be pushed into the small cylindrical bore and at the same time the other shift rod retracted or drawn out from the small cylindrical bore.

Spaced coaxially from right to left in the figure within the sleeve member 17a are a large cylindrical bore 24a, a small cylindrical bore 25a, a medium cylindrical bore 26a and another large cylindrical bore 27a. In the same arrangement as with the sleeve member 17b, the sleeve member 17b includes therein a large cylindrical bore 24b, a small cylindrical bore 25b, a medium cylindrical bore 26b and another large cylindrical bore 27b. Stepped spool valves 28a and 28b are coaxially slidably engaged respectively within the small bore 25a and the medium bore 26a and within the small bore 25b and the medium bore 26b. A spring 29a is stretched between the left end face of the stepped spool valve 28a and the right end face of the shift rod 18a. Another spring 29b is interposed between the left end face of the stepped spool valve 28b and the right end face of the shift rod 18b. Biasing effect of the spring 29a and 29b works to convey axial movement of the shift rods 18a and 18b respectively to the stepped spool valves 28a and 28b. This causes axial displacement of the stepped spool valves 28a and 28b.

Inching pistons 30a and 30b are axially reciprocatably engaged respectively within the large bore 24a of the sleeve member 17a and the large bore 24b of the sleeve member 17b. These inching pistons 30a and 30b are connected to each other with a connecting member 31 to be operative in a piece in response with operation of a brake cylinder 34. The brake cylinder 34 comprises a housing 34a, and a piston 32 normally biased rightward by a spring 31a. The brake cylinder 34 is connected to a master cylinder 36 through a conduit which further extends to service brakes 35, the master cylinder 36 being operated by depression of a brake pedal 37 of the vehicle. The piston 32 of the brake cylinder 34 is connected with the connecting member 31 so that the inching pistons 30a and 30b are thrusted leftward when the piston 32 is actuated to move leftward.

Spring 33a and 33b are installed respectively between the right end face of the stepped spool valve 28a and the left end face of the inching piston 30a and between the right end face of the stepped spool valve 28b and the left end face of the inching piston 30b. Biasing force of the springs 33a and 33b works to transmit axial movement of the inching pistons 30a and 30b to the stepped spool valves 28a and 28b respectively. This causes axial displacement of the stepped spool valves 28a and 28b.

It is well seen in the drawing that provided further with the preferred embodiment is conventional clutch means 45. The clutch means 45 may comprise a clutch hub 48 and two clutch assemblies 45a and 45b respectively for forward and reverse movements of the vehicle. The forwarding clutch assembly 45a includes a piston 46a operated by fluid pressure delivered from the control valve means 5, clutch discs engageable when the piston 46a is actuated, a return spring 47a normally biasing the piston 46a to condition the clutch assembly 45a to its disengagement and a driven shaft 49a. The reversing clutch assembly 45b is constructed in the same way at the forwarding clutch assembly 45a.

The fluid pressure circuit for the present embodiment comprises the conduit 3 connected with pump 1, the first pressure chamber 71 of the modulator valve means 4 through a first inlet port thereof and an inlet port provided on the housing 5a of the control valve means 5. A conduit 38a connects a first outlet port of the control valve means 5 with an inlet port of the forwarding clutch assembly 45a. A conduit 38b connects a second outlet port of the control valve means 5 with an inlet port of the reversing clutch assembly 45b. A second inlet port of the modulator valve means 4 opens to the second pressure chamber 81 and is in connection with a conduit 39. At the end of the conduit 39, a change valve 42 is disposed within the conduit 39. Then, branch conduits 40 and 41 start from the end portion of the conduit 39 and get in connection respectively with the conduits 38a and 38b.

Referring now to the operation of the mechanism disclosed, the drawing depicts that the shift lever 23 is conditioned to its neutral position. In this neutral status, fluid pressure discharged from the pump 1 is delivered to the first pressure chamber of the modulator valve means 4 through the conduit 2 and to the inlet ports of the control valve means 5 through the conduit 3. The fluid pressure delivered to the control valve means 5 is blocked by lands provided on the stepped spool valves 28a and 28b and no fluid pressure flows through the conduits 38a and 38b. The fluid pressure supplied to the modulator valve means 4 acts on the right end face of the valve spool 7 which then moves leftward against resilient force of the spring 9. This makes the fluid pressure flow into the drain passage way 43 to keep the fluid pressure at the predetermined lowest value. The lowest value of the pressure in the mentioned status should be controlled to be the minimum necessary one to lubricate the clutch discs of the clutch means 45 and a torque convertor of the vehicle (not shown). This valve is also to be preferably set within the amount against which the clutch piston 46a is movable by way of the return spring 47a of the clutch 45a.

When the shift lever 23 is shifted to the "F" or forward direction, the shift rod 18a is pushed in and the shift rod 18b is drawn out. A little open space between the pin 48 and the shift lever 23 causes the displacement of the shift rod 18a, the ball 21b staying on the large diameter portion of the shift rod 18b. Then, the stepped spool valve 28a moves rightward by means of the spring 29a. And the conduit 3 becomes open to the conduit 38a, while the conduit 3 is kept blocked to the conduit 38b as there happens no displacement of the stepped spool valve 28b. This supplies fluid pressure to the forwarding clutch to start the vehicle forward.

The pressure value acting on the forwarding clutch is at first the predetermined lowest one. But the fluid pressure flowing into the conduit 40 bifurcated from the conduit 38a thrusts the change valve 42 leftward to have the fluid pressure which is reduced by the orifice valve 12 act on the left end face of the valve piston 8 through the conduit 39. The rightward movement of the valve piston 8 urges the spring 9 to urge in turn the valve spool 7 rightward. The fluid pressure regulated by the valve spool 7 increases until the pressure finally urges the valve spool 7 to its right end position at a certain predetermined high value. The maximam rightward displacement of the spool 7 makes the modulator valve means 4 inoperative, the line pressure then having a sharp increase.

The stepped spool valve 28a of the control valve means 5 is moved leftward against the resilient force of the spring 29a by means of the line pressure acting on the area difference of the stepped spool valve 28a thereof. This connects the conduit 3 with the drain port 44 to hold the predetermined value of the fluid pressure. Consequently, the clutch is gradually engaged within the pressure value regulated by the modulator valve means 4 and the full engagement of the clutch 45 is performed within the pressure value regulated by the control valve means 5.

Inching operation can be realized through the operation of the brake pedal 37; the depressed stroke of the brake pedal 37 operates the brake cylinder 34 to urge the inching pistons 30a and 30b leftward through the connecting member 31. This varies load onto the spring 33a biasing the stepped spool valve 28a. The fluid pressure regulated by the stepped spool valve 28a decreases in response with the depressed stroke of the brake pedal 37 and the half engaging operation of the clutch can easily be obtained.

In the case the shift lever 23 is turned back to its neutral position, the control valve means 5 returns to the status illustrated in the drawing. The orifice valve 12 of the modulator valve means 4 moves leftward against the resilient force of the spring 14 to lead the fluid pressure within the second pressure chamber 81 to the drain passage 43. This makes the modulator valve means 4 return to the status as illustrated in the drawing.

For the reverse movement of the vehicle, the reverse valve group having reference numerals with "b" suffixes, which are positioned in the lower portion of the control valve means 5 in the drawing, has the same operation as mentioned for the forward movement of the vehicle.

In the aforementioned preferred embodiment, modulator valve means is equipped with control valve means but the control valve alone can render the same effects.

Finally, it will be noted that the aforementioned construction blocks the flow of the pressurized operation fluid into the control valve means 5 by means of the stepped spool valve while the shift lever 23 is conditioned to its neutral position. Thus, the spool valve 7 of the modulator valve means 4 becomes open to regulate the fluid pressure to be the predetermined lowest value. The modulator valve means 4 controls the fluid pressure between the lowest one up to the one to overcome the resilient force of the return spring 47 of the clutch 45. At the moment of the shifting operation, the mentioned lowest pressure regulated by the stepped valve of the control valve means 5 acts on the clutch 45 to realize half engaging operation of the clutch. Then, the spool valve 7 of the modulator valve means 4 cuts off the drain passage to make the modulator valve means inoperative. In the control valve means 5 after completion of the shift change operations, the stepped valve 28a or 28b is well-balanced by way of the urging force of the springs 29a or 29b responding to the shift lever and that of the springs 33a or 33b responding to the brake pedal 37. Slow displacement of the shift lever 23 can regulate fluid pressure delivered to the clutch 45 to increase gradually so that the starting acceleration can be controlled as desired. The same operation and effect can be obtained through the operation of the brake pedal. Consequently, remarkably novel features in the present invention can easily be recognized in the fact that at any operation of the prime engine, accurate and smooth inching operation is obtainable and the dangerous and unpleasant shock at starting can well be controlled.

While we have herein shown and described only a certain embodiment of certain features of our present invention, it is to be understood that this is to be regarded merely as illustrative and that we do not intend to limit ourself thereto except as may be required by the following claims:

What is claimed is:

1. Control apparatus for a vehicle having a transmission with fluid-actuated clutch means and hydraulic brake means for arresting movement of the vehicle, comprising a source of fluid pressure including fluid-pressurizing means therefor; a fluid pressure conduit connecting said pressure source with said clutch means; control valve means disposed in said conduit, said control valve means including a housing provided with a pair of cylindrical bores located parallel to each other, a pair of spool valves axially slidably engaged respectively within said bores, said housing having ports communicating with said conduit, means on said spool valves defining respective pressure chambers at times in communication with said conduit through said ports and located to selectively control passage of pressure fluid through said conduit responsive to movement of said spool valves, whereby to activate and de-activate said clutch means, a pair of inching pistons slidably disposed within said bores, respective force-transmitting resilient members interposed between said inching pistons and said spool valves, means interconnecting said brake means with said inching pistons, a pair of respective shift rods slidably engaged in said bores, further force-transmitting resilient members interposed between said shift rods and said spool valves, and a shift lever connected to said shift rods for selectively operating said rods so that selected operation of said shift rods by said shift lever selectively moves said spool valves and so that a selected spool valve controls fluid pressure in the conduit in accordance with the fluid pressure value in its associated pressure chamber, whereby said spool valves are operated by said inching pistons and first-named resilient members when the brake means is operated to arrest the vehicle, whereby to provide inching effects.

2. The control apparatus as set forth in claim 1, wherein each of said cylindrical bores comprises a large diameter bore portion and a small diameter bore portion axially aligned within said housing and each of said spool valves is provided with a large diameter land slidably engageable with said large diameter bore portion and a small diameter land slidably engaged with said small diameter bore portion, so that said pressure chamber is formed by said two lands.

3. The control apparatus as set forth in claim 1, wherein each of said spool valves is provided with a large diameter land and a small diameter land and wherein a sleeve member is provided in each of said bores, the sleeve member having a large diameter bore slidably receiving the large diameter land of the associated spool valve and a small diameter bore receiving the small diameter land of the associated spool valve, so that the associated pressure chamber is defined by said two lands, and wherein a drain port is provided in the housing located so as to be at times in communication with said pressure chamber.

4. The control apparatus as set forth in claim 1, wherein said shift lever is pivoted on said housing and said shift rods are connected to the lever in relative positions so as to have relative movement such that when one is moved forwardly, the other is retracted.

5. The control apparatus as set forth in claim 1, wherein said interconnecting means comprises a connecting member to connect said inching pistons to each other, a fluid-actuated cylinder operated by fluid pressure within a braking circuit of said brake means, and means connecting said connecting member to the piston of said cylinder.

6. The control apparatus as set forth in claim 1, wherein said control valve means is provided with modulator valve means for regulating fluid pressure within said conduit in response to the operation of said spool valves.

7. The control apparatus as set forth in claim 6, wherein said modulator valve means comprises a housing provided with an inner bore, first and second chambers connected to said conduit, and a drain chamber in communication with a drain passageway, a valve spool engaged slidably within said inner bore for controlling communication between said first chamber and said drain chamber, a piston slidable within said inner bore and urged by fluid pressure supplied to said second chamber, wherein an orifice valve is provided between said conduit and said second chamber through which pressure fluid is supplied to said second chamber, and wherein a resilient member is provided between said piston and said spool valve urging them in opposite directions, whereby fluid pressure in said conduit is regulated to be of a low value when said spool valve is operated by means of fluid pressure supplied to said first chamber and is regulated to be increased gradually to a predetermined high value when said piston is operated by fluid pressure supplied to said second chamber in response to the shifting operation of said spool valves of said control valve means.

* * * * *